(12) United States Patent
Hayashi et al.

(10) Patent No.: US 11,939,887 B2
(45) Date of Patent: Mar. 26, 2024

(54) TURBOCHARGER WITH NOZZLE RING

(71) Applicant: IHI Corporation, Tokyo (JP)

(72) Inventors: Katsunori Hayashi, Tokyo (JP); Kengo Ikeda, Tokyo (JP)

( * ) Notice: Subject to any disclaimer, the term of this patent is extended or adjusted under 35 U.S.C. 154(b) by 0 days.

(21) Appl. No.: 18/049,638

(22) Filed: Oct. 26, 2022

(65) Prior Publication Data

US 2023/0077677 A1   Mar. 16, 2023

Related U.S. Application Data

(63) Continuation of application No. PCT/JP2021/020283, filed on May 27, 2021.

(30) Foreign Application Priority Data

Jun. 2, 2020 (JP) ................................. 2020-096189

(51) Int. Cl.
*F01D 9/04* (2006.01)
*F01D 17/16* (2006.01)
*F01D 25/24* (2006.01)

(52) U.S. Cl.
CPC ............. *F01D 9/04* (2013.01); *F01D 17/165* (2013.01); *F01D 25/246* (2013.01); *F05D 2220/40* (2013.01); *F05D 2230/64* (2013.01)

(58) Field of Classification Search
CPC ............................. F04D 19/002; F04D 29/384
See application file for complete search history.

(56) References Cited

U.S. PATENT DOCUMENTS

| 2009/0317247 A1 | 12/2009 | Hoecker et al. |
| 2010/0196146 A1 | 8/2010 | Wengert et al. |
| 2014/0161595 A1 | 6/2014 | Tashiro et al. |

(Continued)

FOREIGN PATENT DOCUMENTS

| JP | H11-336553 | 12/1999 |
| JP | 2007-187015 | 7/2007 |
| JP | 2009-062840 | 3/2009 |

(Continued)

OTHER PUBLICATIONS

International Search Report dated Jul. 13, 2021 for PCT/JP2021/020283.

(Continued)

*Primary Examiner* — Jacob M Amick
*Assistant Examiner* — Charles J Brauch
(74) *Attorney, Agent, or Firm* — SOEI PATENT & LAW FIRM

(57) ABSTRACT

A turbocharger includes a first housing configured to house a turbine impeller, a second housing configured to rotatably support a rotating shaft to which the turbine impeller is fixed, and a variable capacity mechanism configured to surround the turbine impeller and to guide a fluid to the turbine impeller. The variable capacity mechanism has a nozzle ring that faces the second housing. A first pin and a second pin extend between the second housing and the nozzle ring and are attached to one of the second housing and the nozzle ring. The other of the second housing and the nozzle ring is provided with a first guide in which an end portion of the first pin is disposed and a second guide in which an end portion of the second pin is disposed.

20 Claims, 12 Drawing Sheets

(56) References Cited

U.S. PATENT DOCUMENTS

2018/0363493 A1   12/2018   Asakawa et al.

FOREIGN PATENT DOCUMENTS

| JP | 2009062840 A * | 3/2009 |
| JP | 2013-072403 | 4/2013 |
| JP | 2013-104413 | 5/2013 |
| JP | 2014-092132 | 5/2014 |
| WO | 2017/150450 | 9/2017 |

OTHER PUBLICATIONS

International Preliminary Report on Patentability with Written Opinion dated Dec. 15, 2022 for PCT/JP2021/020283.

* cited by examiner

TURBOCHARGER WITH NOZZLE RING

CROSS-REFERENCE TO RELATED APPLICATIONS

This application is a continuation application of PCT Application No. PCT/JP2021/020283, filed on May 27, 2021, which claims the benefit of priority from Japanese Patent Application No. 2020-096189, filed on Jun. 2, 2020. The entire contents of the above listed PCT and priority applications are incorporated herein by reference.

BACKGROUND

International PCT Publication No. WO 2017/150450 discloses a variable capacity turbocharger. A variable capacity turbocharger changes a flow path area of a gas using a plurality of nozzle vanes. As a result, a flow velocity of a gas to be supplied to a turbine impeller can be controlled.

SUMMARY

An example turbocharger of the present disclosure includes a first housing configured to house a turbine impeller, a second housing configured to rotatably support a rotating shaft to which the turbine impeller is fixed, and a variable capacity mechanism configured to surround the turbine impeller and to guide a fluid to the turbine impeller. The variable capacity mechanism has a nozzle ring that faces the second housing. A first pin and a second pin extending between the second housing and the nozzle ring are attached to one of the second housing and the nozzle ring. The other of the second housing and the nozzle ring is provided with a first guide in which an end portion of the first pin is disposed and a second guide in which an end portion of the second pin is disposed.

DETAILED DESCRIPTION

Figure 1:
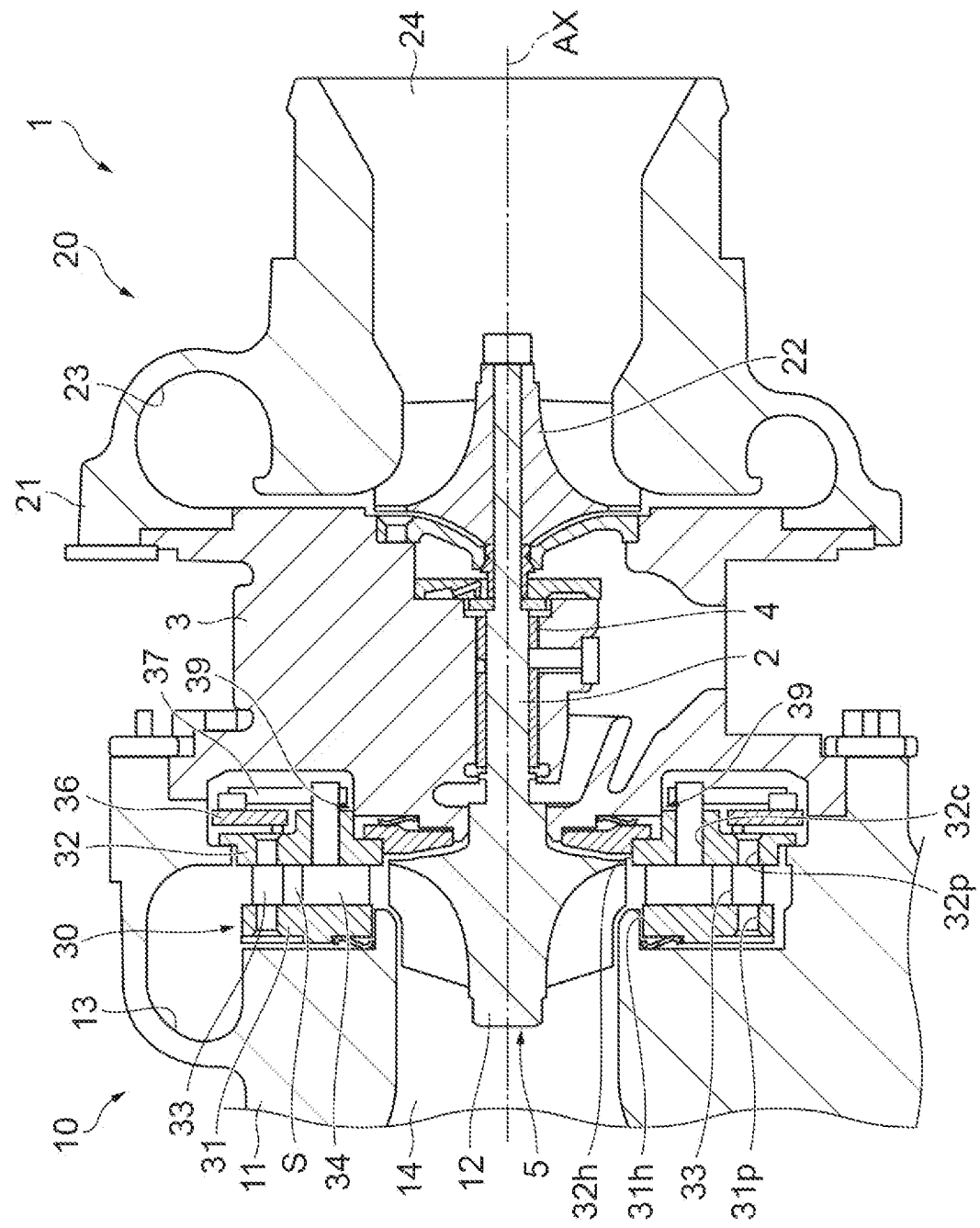
FIG. 1 is a cross-sectional view illustrating an example turbocharger.

In the following description, with reference to the drawings, the same reference numbers are assigned to the same components or to similar components having the same function, and overlapping description is omitted.

An example turbocharger of the present disclosure includes a first housing configured to house a turbine impeller; a second housing configured to rotatably support a rotating shaft to which the turbine impeller is fixed, and a variable capacity mechanism configured to surround the turbine impeller and to guide a fluid to the turbine impeller. The variable capacity mechanism has a nozzle ring that faces the second housing. A first pin and a second pin extending between the second housing and the nozzle ring are attached to one of the second housing and the nozzle ring. The other of the second housing and the nozzle ring is provided with a first guide in which an end portion of the first pin is disposed and a second guide in which an end portion of the second pin is disposed.

When thermal deformation occurs, the relative positional relationship of the variable capacity mechanism with respect to the second housing is maintained due to the regulation of the first pin and the first guide and the regulation of the second pin and the second guide.

In one example, the first guide may be an elongated hole or groove extending in a direction of a first guide axis. Also with this configuration, the relative positional relationship of the variable capacity mechanism with respect to the second housing is maintained.

In one example, the first guide axis may intersect with a rotation axis of the turbine impeller. Also with this configuration, the relative positional relationship of the variable capacity mechanism with respect to the second housing is maintained.

In one example, the second guide may be a round hole. The second guide may be provided on a perpendicular line to the first guide axis. An intersection between the first guide axis and the perpendicular line may overlap a center of the nozzle ring. Also with this configuration, the relative positional relationship of the variable capacity mechanism with respect to the second housing is maintained.

In one example, the second guide may be a round hole. The second guide may be provided on a perpendicular line to the first guide axis. An intersection between the first guide axis and the perpendicular line may not overlap a center of the nozzle ring. Also with this configuration, the relative positional relationship of the variable capacity mechanism with respect to the second housing is maintained.

In one example, the first guide may be an elongated hole or groove extending in a direction of a first guide axis. The second guide may be an elongated hole or groove extending in a direction of a second guide axis different from the first guide axis. Also with this configuration, the relative positional relationship of the variable capacity mechanism with respect to the bearing housing is maintained.

In one example, the first guide axis may intersect with the second guide axis. Also with this configuration, the relative positional relationship of the variable capacity mechanism with respect to the second housing is maintained.

In one example, a point where the first guide axis and the second guide axis intersect with each other may overlap a center of the nozzle ring. Also with this configuration, the relative positional relationship of the variable capacity mechanism with respect to the second housing is maintained.

In one example, a point where the first guide axis and the second guide axis intersect with each other may not overlap a center of the nozzle ring. Also with this configuration, the relative positional relationship of the variable capacity mechanism with respect to the second housing is maintained.

In one example, the first guide axis may be parallel to the second guide axis. Also with this configuration, the relative positional relationship of the variable capacity mechanism with respect to the second housing is maintained.

In one example, the first guide axis may be separated from the second guide axis in a direction orthogonal to the first guide axis. Also with this configuration, the relative positional relationship of the variable capacity mechanism with respect to the second housing is maintained.

In one example, the first guide axis and the second guide axis may be common axes that pass through a center of the nozzle ring. Also with this configuration, the relative positional relationship of the variable capacity mechanism with respect to the second housing is maintained.

In one example, one of the second housing and the nozzle ring may be further provided with a third pin extending between the second housing and the nozzle ring. The other of the second housing and the nozzle ring may be provided with a third guide in which an end portion of the third pin is disposed. Also with this configuration, the relative positional relationship of the variable capacity mechanism with respect to the second housing is maintained.

In one example, the third guide may be an elongated hole or groove extending in a direction of a third guide axis that intersects with a rotation axis of the turbine impeller. The third pin may be disposed on a perpendicular bisector of a line connecting a center of the first pin and a center of the second pin. Also with this configuration, the relative positional relationship of the variable capacity mechanism with respect to the second housing is maintained.

In one example, the nozzle ring may be provided with a through hole. The second housing may be provided with a fitting portion to be fitted into the through hole. According to this configuration, the nozzle ring and the second housing can constitute a so-called centering location structure (e.g., a spigot type structure). Therefore, the relative positional relationship of the variable capacity mechanism with respect to the second housing can be maintained.

The example turbocharger 1 illustrated in FIG. 1 is a variable capacity turbocharger. The turbocharger 1 is applied to, for example, an internal combustion engine of a ship or a vehicle. The turbocharger 1 has a turbine 10 and a compressor 20. The turbine 10 has a turbine housing 11 (e.g., a first housing), a turbine impeller 12, and a variable capacity mechanism 30. The turbine housing 11 has a scroll flow path 13. The scroll flow path 13 extends around the turbine impeller 12 in a circumferential direction. The compressor 20 has a compressor housing 21 and a compressor impeller 22. The compressor impeller 22 is housed in the compressor housing 21. The compressor housing 21 has a scroll flow path 23. The scroll flow path 23 extends around the compressor impeller 22 in the circumferential direction.

The turbine impeller 12 is provided at a first end of a rotating shaft 2. The compressor impeller 22 is provided at a second end of the rotating shaft 2. A bearing housing 3 (e.g., a second housing) is provided between the turbine housing 11 and the compressor housing 21. The bearing housing 3 is disposed adjacent to the turbine housing 11. The rotating shaft 2 is rotatably supported by the bearing housing 3 via a bearing 4. The rotating shaft 2, the turbine impeller 12, and the compressor impeller 22 constitute an integrated rotating body 5. The rotating body 5 rotates around a rotation axis AX.

The turbine housing 11 has an inlet and an outlet 14. An exhaust gas discharged from an internal combustion engine flows into the turbine housing 11 after passing through the inlet. The inflowing exhaust gas flows into the turbine impeller 12 after passing through the scroll flow path 13. Then, the exhaust gas rotates the turbine impeller 12. After that, the exhaust gas flows out of the turbine housing 11 after passing through the outlet 14.

The compressor housing 21 has a suction port 24 and a discharge port. When the turbine impeller 12 rotates, the compressor impeller 22 rotates via the rotating shaft 2. The rotating compressor impeller 22 sucks in external air through the suction port 24. The sucked air is compressed while passing through the compressor impeller 22 and the scroll flow path 23. The air is discharged from the discharge port as compressed air. The compressed air is supplied to the internal combustion engine.

The turbine 10 has a connecting flow path S. The connecting flow path S guides the exhaust gas from the scroll flow path 13 to the turbine impeller 12. A plurality of nozzle vanes 34 are disposed in the connecting flow path S. The plurality of nozzle vanes 34 are disposed at equal intervals on a reference circle centered on the rotation axis AX. The nozzle vanes 34 adjacent to each other constitute a nozzle. The plurality of nozzle vanes 34 rotate around axes parallel to the rotation axis AX. The rotation of the plurality of nozzle vanes 34 is synchronized. When the plurality of nozzle vanes 34 rotate, a cross-sectional area of the connecting flow path S is adjusted. The turbine 10 has the variable capacity mechanism 30 as a mechanism for adjusting the cross-sectional area of the connecting flow path S. The variable capacity mechanism 30 is attached to the turbine housing 11.

<Variable Capacity Mechanism>

Figure 2:
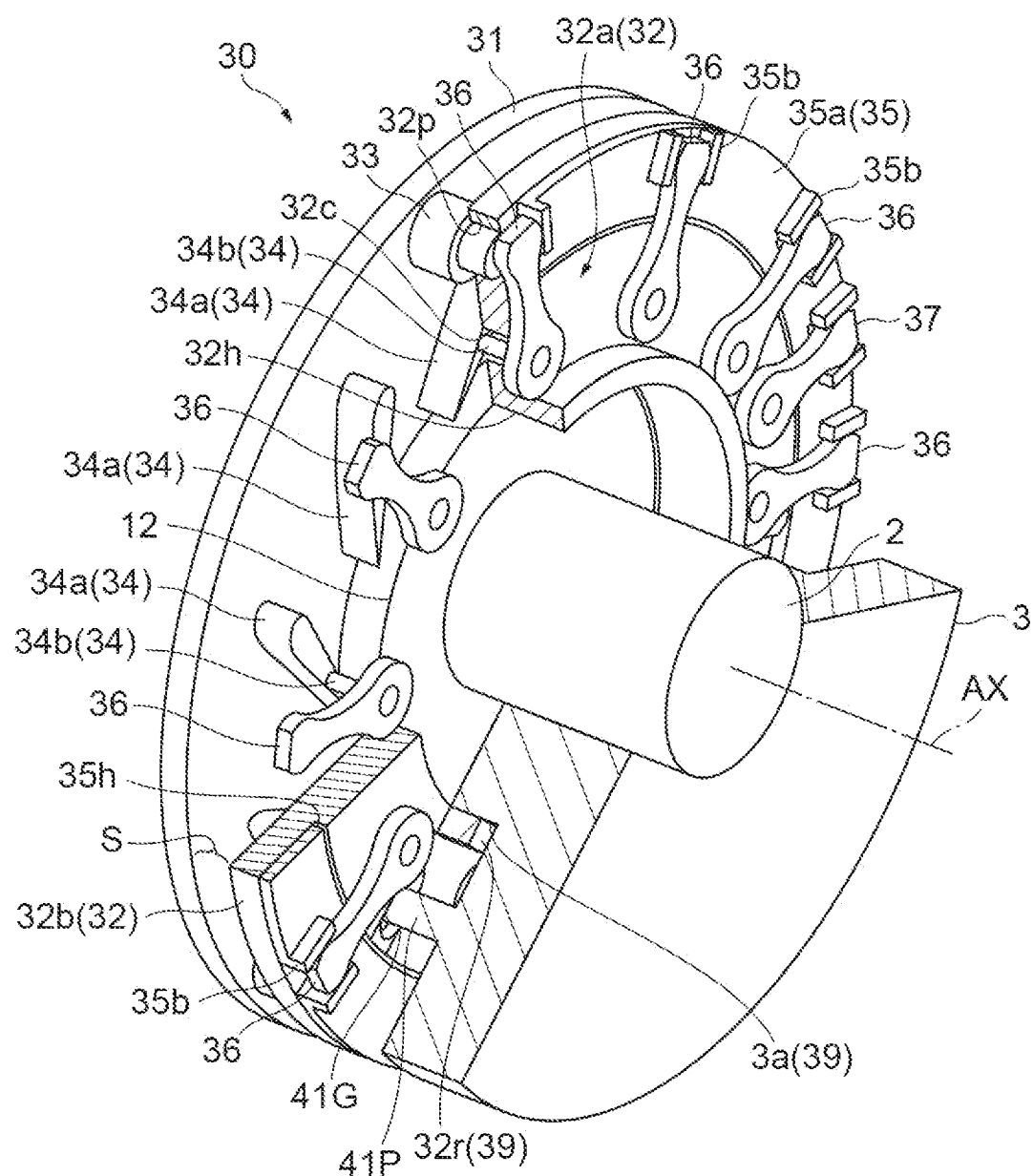
FIG. 2 is a perspective view illustrating an example variable capacity mechanism.

As shown in FIGS. 1 and 2, the variable capacity mechanism 30 has a clearance control plate (a CC plate) 31, a nozzle ring 32, and a plurality of clearance control pins (CC pins) 33. The nozzle ring 32 faces the CC plate 31. The nozzle ring 32 is disposed between the turbine housing 11 and the bearing housing 3. The CC pins 33 connect the CC plate 31 to the nozzle ring 32. The connecting flow path S is formed between the CC plate 31 and the nozzle ring 32. The nozzle ring 32 faces the bearing housing 3 and forms the connecting flow path S communicating with the scroll flow path 13. The variable capacity mechanism 30 further has the plurality of nozzle vanes 34, a drive ring 35, a plurality of nozzle link plates 36, and a drive link plate 37. The nozzle link plates 36 and the drive link plate 37 are disposed on a side opposite to the CC plate 31 with respect to the nozzle ring 32. The drive ring 35 and the drive link plate 37 cooperate to rotate the nozzle link plates 36. When the nozzle link plates 36 rotate, the nozzle vanes 34 rotate.

The shape of the CC plate 31 is a ring shape centered on the rotation axis AX. The CC plate 31 has a shaft hole 31*h* (see FIG. 1). The CC plate 31 surrounds the turbine impeller 12 disposed in the shaft hole 31*h* in the circumferential direction. The circumferential direction of the turbine impeller 12 is a direction centered on the rotation axis AX. The CC plate 31 is disposed between the scroll flow path 13 and the outlet 14. The CC plate 31 is separated from the nozzle ring 32 along the rotation axis AX. The connecting flow path S is formed between the CC plate 31 and the nozzle ring 32. The connecting flow path S connects the scroll flow path 13 to the outlet 14. The CC plate 31 is disposed on a side opposite to the bearing housing 3 with respect to the nozzle ring 32. The CC plate 31 has a plurality of pin holes 31p. The intervals between the plurality of pin holes 31p in the circumferential direction are equal to each other.

The shape of the nozzle ring 32 is also a ring shape centered on the rotation axis AX. The nozzle ring 32 has a shaft hole 32h (e.g., a through hole). The nozzle ring 32 also surrounds the turbine impeller 12 disposed in the shaft hole 32h in the circumferential direction. The nozzle ring 32 is also disposed between the scroll flow path 13 and the outlet 14. The CC plate 31 is parallel to the nozzle ring 32. The nozzle ring 32 has a plurality of pin holes 32p. The intervals between the plurality of pin holes 32p in the circumferential direction are equal to each other. A center axis of the pin hole 32p overlaps a center axis of the pin hole 31p. The pin hole 32p is coaxial with the pin hole 31p. The nozzle ring 32 has a nozzle ring main body 32a and a nozzle ring flange 32b. The shape of the nozzle ring main body 32a is a cylindrical shape. The nozzle ring main body 32a has the shaft hole 32h. The nozzle ring main body 32a has a plurality of vane shaft holes 32c. The intervals between the plurality of vane shaft holes 32c in the circumferential direction are equal to each other. The nozzle ring flange 32b protrudes from an outer peripheral surface of the nozzle ring main body 32a in a radial direction. An outer diameter of the nozzle ring 32 is defined by an outer diameter of the nozzle ring flange 32b. The nozzle ring flange 32b has the plurality of pin holes 32p. The position of the pin hole 32p is outside the position of the vane shaft hole 32c in the radial direction of the nozzle ring 32.

The nozzle ring 32 is separated from the CC plate 31. That is, a gap is formed between the nozzle ring 32 and the CC plate 31. This gap is the connecting flow path S through which the exhaust gas passes. The gap between the nozzle ring 32 and the CC plate 31 is maintained by the CC pins 33. A first end of the CC pin 33 is inserted into the pin hole 31p of the CC plate 31. A second end of the CC pin 33 is inserted into the pin hole 32p of the nozzle ring 32.

The plurality of nozzle vanes 34 are disposed between the nozzle ring 32 and the turbine housing 11. The nozzle vanes 34 are rotatably supported by the nozzle ring 32. The nozzle vanes 34 are disposed on the reference circle centered on the rotation axis AX. The nozzle vane 34 has a vane main body 34a and a vane shaft 34b. The vane main body 34a is disposed between the CC plate 31 and the nozzle ring 32. The vane main body 34a is disposed in the connecting flow path S. A first end of the vane shaft 34b is fixed to the vane main body 34a. A second end of the vane shaft 34b is inserted into the vane shaft hole 32c of the nozzle ring 32. A tip end portion of the second end of the vane shaft 34b protrudes from the nozzle ring main body 32a. The vane shaft 34b is rotatable with respect to the nozzle ring 32. The vane main body 34a rotates with the rotation of the vane shaft 34b. In the variable capacity mechanism 30, the cross-sectional area of the connecting flow path S is adjusted by rotating the vane main body 34a. As a result of adjusting the cross-sectional area, a flow velocity of the exhaust gas to be supplied from the scroll flow path 13 to the turbine impeller 12 is controlled. Therefore, the rotation speed of the turbine impeller 12 can be controlled to a desired value.

The drive ring 35 is disposed on the nozzle ring flange 32b. The shape of the drive ring 35 is a ring shape centered on the rotation axis AX. The drive ring 35 has a shaft hole 35h. The nozzle ring main body 32a is inserted into the shaft hole 35h. The drive ring 35 is coaxial with the nozzle ring 32. The drive ring 35 is rotatable with respect to the nozzle ring 32 about the rotation axis AX. The drive ring 35 has a drive ring main body 35a and a plurality of link plate arrangement portions 35b. The intervals between the link plate arrangement portions 35b in the circumferential direction are equal to each other. The link plate arrangement portion 35b has two upright members that are separated from each other in the circumferential direction.

The shape of the nozzle link plate 36 is bar-shaped. A first end of the nozzle link plate 36 is fixed to an end portion of the vane shaft 34b. A second end of the nozzle link plate 36 is disposed in the link plate arrangement portion 35b of the drive ring 35. The second end of the nozzle link plate 36 is disposed between the two upright members of the link plate arrangement portion 35b. When the drive ring 35 receives a driving force from the drive link plate 37, the drive ring 35 rotates about the rotation axis AX. The second end of the nozzle link plate 36 moves in the circumferential direction with the rotation of the drive ring 35. Due to the movement of the second end of the nozzle link plate 36, the nozzle link plate 36 rotates about the vane shaft 34b. With the rotation of the nozzle link plate 36, the vane shaft 34b attached to the first end of the nozzle link plate 36 rotates. With the rotation of the vane shaft 34b, the vane main body 34a attached to the first end of the vane shaft 34b rotates. As a result, the intervals between the vane main bodies 34a change. That is, the cross-sectional area of the connecting flow path S changes.

When the turbocharger 1 is in an operating state (in a hot state), the heated exhaust gas flows through the turbine 10. Therefore, temperatures of the scroll flow path 13, the variable capacity mechanism 30, the turbine impeller 12, and the like through which the exhaust gas flows rise. The rise in temperature causes thermal deformation of components, which may affect the positional relationship between the variable capacity mechanism 30 and the bearing housing 3.

The variable capacity mechanism 30 is positioned with respect to the bearing housing 3. A protruding portion 3a of the bearing housing 3 is fitted in the shaft hole 32h of the nozzle ring 32 of the variable capacity mechanism 30. An outer peripheral surface of the protruding portion 3a (e.g., a fitting portion) is in contact with an inner peripheral surface of the shaft hole 32h. Therefore, the variable capacity mechanism 30 and the bearing housing 3 work together to form a centering location structure (a spigot type structure) 39. A rib 32r of the nozzle ring main body 32a and the protruding portion 3a of the bearing housing 3 constitute the centering location structure (the spigot type structure) 39. A position of the variable capacity mechanism 30 with respect to the bearing housing 3 is determined by the centering location structure (the spigot type structure) 39.

When temperatures of the components rise during operation, the exhaust gas flows inside the variable capacity mechanism 30. Therefore, a temperature of the variable capacity mechanism 30 tends to rise. For example, a temperature difference between a temperature of the variable capacity mechanism 30 before operation (before a temperature rises) and a temperature of the variable capacity mechanism 30 during operation (after a temperature rises) is larger than a temperature difference between a temperature of the bearing housing 3 before operation and a temperature of the bearing housing 3 during operation. As a result, the amount of thermal deformation of the variable capacity mechanism 30 is larger than the amount of thermal deformation of the bearing housing 3. Then, a change occurs in the above-mentioned centering location structure (the spigot type structure) 39. As a result of thermal deformation of the nozzle ring 32, an inner diameter of the shaft hole 32h becomes larger. As a result of thermal deformation of the bearing housing 3, an outer diameter of the protruding portion 3a becomes larger. However, the amount of increase in the inner diameter of the shaft hole 32h does not match the amount of increase in the outer diameter of the protruding portion 3a. The amount of increase in the inner diameter of the shaft hole 32h is larger than the amount of increase in the outer diameter of the protruding portion 3a. Before the thermal deformation occurs, the outer peripheral surface of the protruding portion 3a is in contact with the inner peripheral surface of the shaft hole 32h. After the thermal deformation occurs, a gap is formed between the inner peripheral surface of the shaft hole 32h and the outer peripheral surface of the protruding portion 3a.

Figure 10:
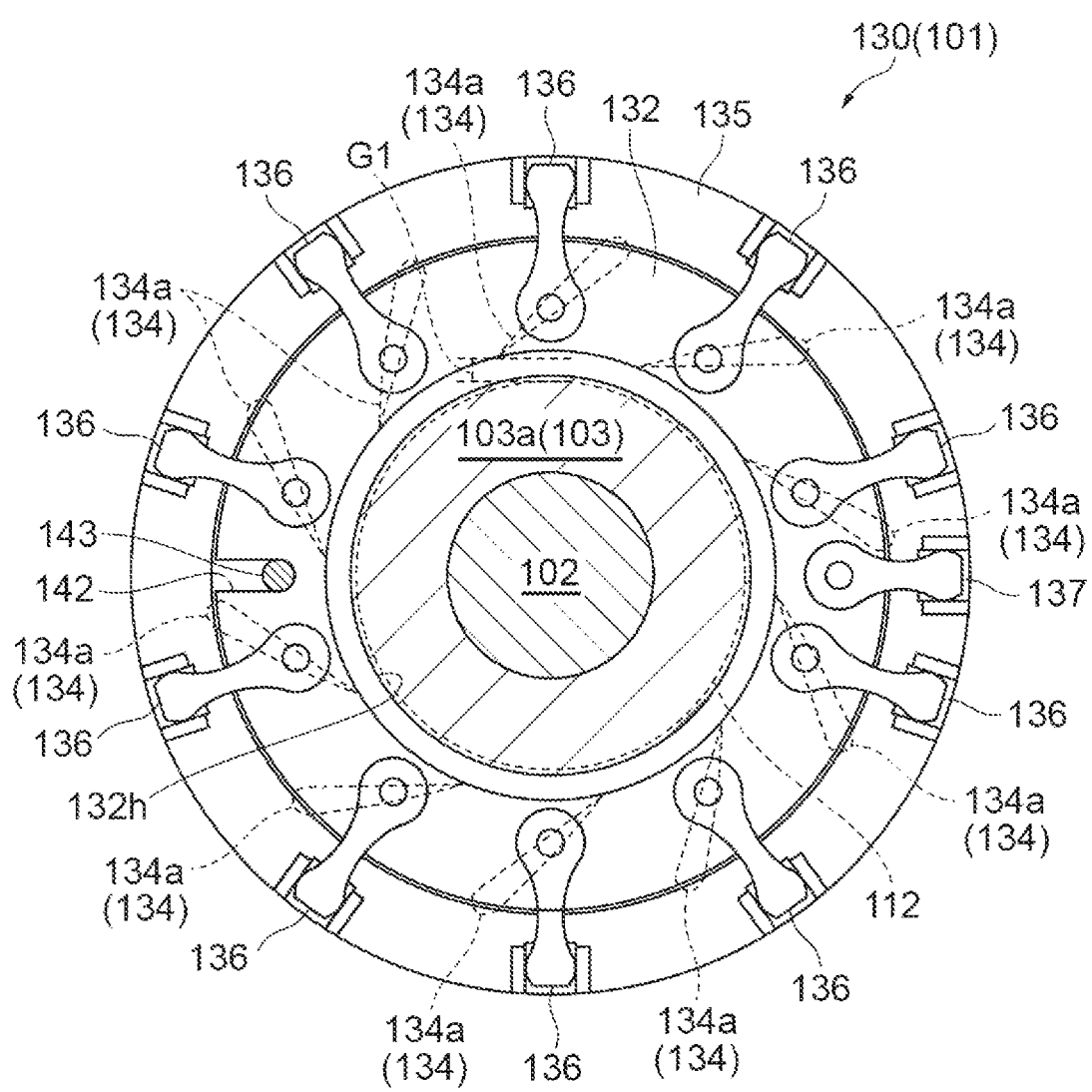
FIG. 10 is a plan view of a variable capacity mechanism included in a turbocharger of a comparative example.

FIG. 10 illustrates an example variable capacity mechanism 130 included in a turbocharger 101 of a comparative example. When a gap is formed between an inner peripheral surface of a shaft hole 132h and an outer peripheral surface of a protruding portion 103a, the variable capacity mechanism 130 is in a state of being relatively movable with respect to a bearing housing 103. For example, the variable capacity mechanism 130 moves vertically downward with respect to the bearing housing 103. The bearing housing 103 moves vertically upward with respect to the variable capacity mechanism 130.

When the bearing housing 103 moves relatively vertically upward with respect to the variable capacity mechanism 130, a cross-sectional area of a connecting flow path formed by a nozzle vane 134 changes. An actual cross-sectional area of the connecting flow path formed by the nozzle vane 134 during operation is different from a cross-sectional area of a connecting flow path in design. A variation in flow velocity of the exhaust gas to be supplied to a turbine impeller 112 may affect the intended performance of the turbocharger 101.

A relationship between the relative position deviation of the bearing housing 103 with respect to the variable capacity mechanism 130 and the movement of the nozzle vane 134 will be described in further detail. As to the relationship between the position deviation and the movement of the nozzle vane 134, three example states will be described.

Figure 11:
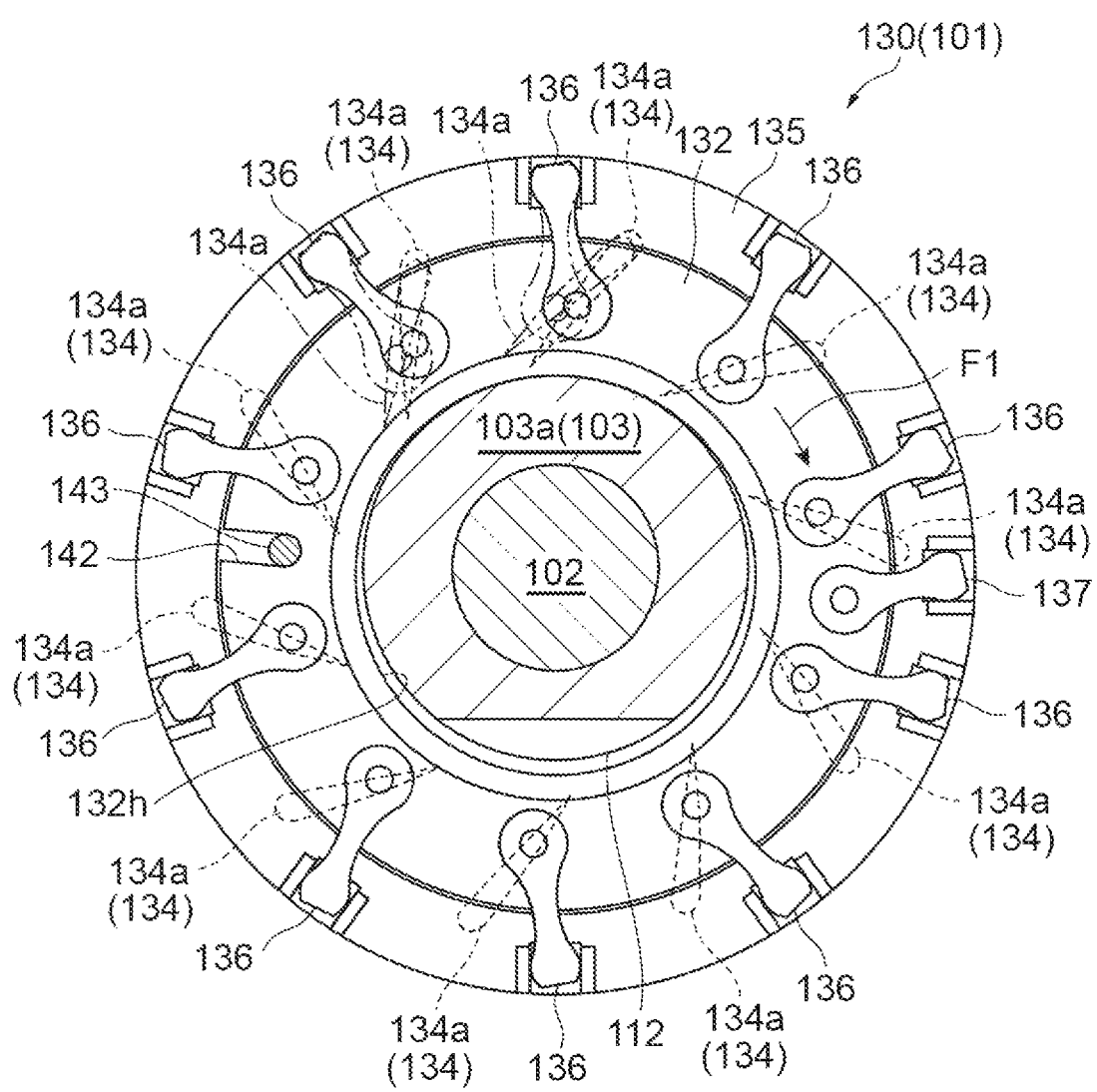
FIG. 11 is a plan view of the variable capacity mechanism of FIG. 10 illustrating a first example state of operation of the comparative example.

A first state involves the movement of a regulation pin 143 due to the movement of the bearing housing 103. As shown in FIG. 11, the bearing housing 103 has the regulation pin 143. The regulation pin 143 is fixed to the bearing housing 103. The regulation pin 143 restricts the movement of the variable capacity mechanism 130 in a rotation direction. A tip end of the regulation pin 143 is inserted into a guide groove 142 of a nozzle ring 132. When the bearing housing 103 moves relatively vertically upward with respect to the variable capacity mechanism 130, the regulation pin 143 also tends to move vertically upward with respect to the variable capacity mechanism 130. Due to the movement of the regulation pin 143, a driving force F1 for rotating the nozzle ring 132 clockwise is generated. The driving force F1 causes the nozzle ring 132 to rotate with respect to a drive ring 135. As a result, the rotation of a nozzle link plate 136 occurs. With the rotation of the nozzle link plate 136, an opening degree of the nozzle vane 134 also changes. For example, the nozzle vane 134 rotates such that a tip end of a vane main body 134a approaches the turbine impeller 112.

Figure 12:
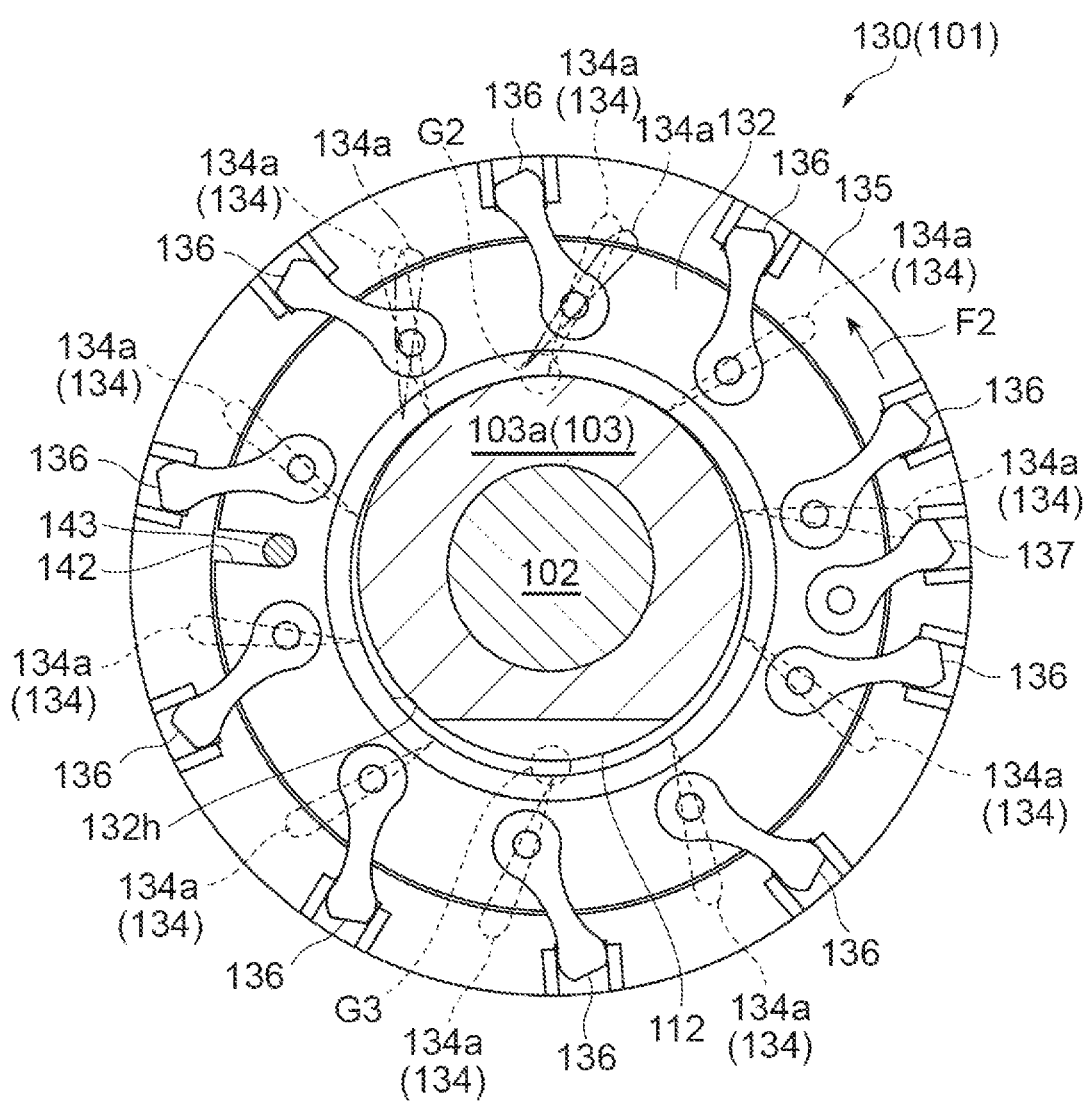
FIG. 12 is another plan view of the variable capacity mechanism of FIG. 10 illustrating a second example state of operation of the comparative example.

A second state involves the movement of a drive link plate 137 due to the movement of the bearing housing 103. As shown in FIG. 12, with the movement of the bearing housing 103, the drive link plate 137 also moves upward. Due to the movement of the drive link plate 137, a driving force F2 for rotating the drive ring 135 counterclockwise with respect to the nozzle ring 132 is generated. The driving force F2 causes the drive ring 135 to rotate with respect to a nozzle ring 132. As a result, the rotation of the nozzle link plate 136 occurs. With the rotation of the nozzle link plate 136, the opening degree of the nozzle vane 134 also changes. For example, the nozzle vane 134 rotates such that the tip end of the vane main body 134a approaches the turbine impeller 112.

The rotation direction of the nozzle ring 132 according to the first state is opposite to the rotation direction of the drive ring 135 according to the second state. That is, due to the first state and the second state, the deviation of the position of the drive ring 135 in the rotation direction with respect to the nozzle ring 132 becomes larger, which results in an excessive rotation amount of the nozzle vane 134.

A third state involves the movement of the variable capacity mechanism 130 with respect to the turbine impeller 112. The bearing housing 103 rotatably holds a rotating shaft 102. Therefore, with the relative movement of the bearing housing 103, the rotating shaft 102 also moves with respect to the variable capacity mechanism 130. The turbine impeller 112 is fixed to an end portion of the rotating shaft 102. That is, with the relative movement of the bearing housing 103, the turbine impeller 112 also moves with respect to the variable capacity mechanism 130, and a bias occurs in a gap between the turbine impeller 112 and the nozzle vane 134. Ideally, a gap G1 (see FIG. 10) between the turbine impeller 112 and the nozzle vane 134 is constant around the rotation axis. However, when the turbine impeller 112 moves with respect to the variable capacity mechanism 130, a portion G2 (see FIG. 12) where the gap becomes narrower and a portion G3 where the gap expands occur in the gap between the turbine impeller 112 and the nozzle vane 134. Due to the position change between the turbine impeller 112 and the nozzle vane 134, the flow velocity of the exhaust gas to be supplied to the turbine impeller 112 also changes.

Due to the relative position deviation of the bearing housing 103 with respect to the variable capacity mechanism 130, the first state, the second state, and third state described above occur. The opening degree of the nozzle vane 134 changes due to the occurrence of the first state, the second state, and the third state. Further, the relative position of the turbine impeller 112 with respect to the nozzle vane 134 changes. As a result, the turbocharger 101 may not operate properly.

On the other hand, the example turbocharger 1 is configured to suppress or minimize the occurrence of the relative position deviation of the bearing housing 3 with respect to the variable capacity mechanism 30 during operation. Hereinafter, a mechanism for suppressing the occurrence of the relative position deviation (hereinafter referred to as a "position deviation regulating mechanism 40") will be described in detail.

Figure 3:
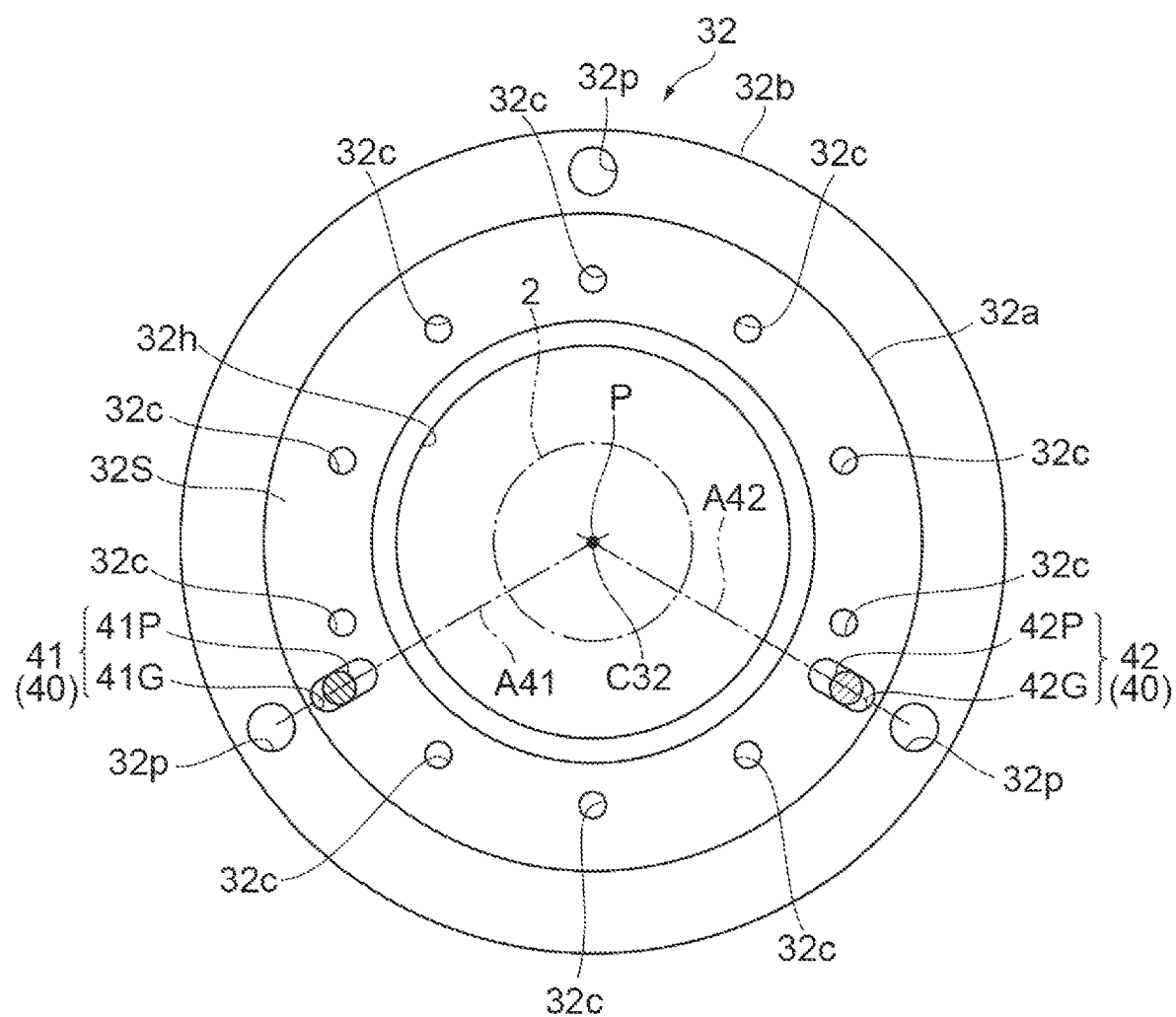
FIG. 3 is a plan view illustrating an example guide hole provided in a nozzle ring of a turbocharger.

As shown in FIG. 3, the position deviation regulating mechanism 40 has a guide portion 41 and a guide portion 42. The guide portion 41 allows translation in a direction of a guide axis A41 (e.g., a first guide axis). On the other hand, the guide portion 41 prohibits translation in other directions. The guide portion 42 allows translation in a direction of a guide axis A42 (e.g., a second guide axis). On the other hand, the guide portion 42 prohibits translation in other directions. The direction of the guide axis A41 is different from the direction of the guide axis A42. For example, an angle between the guide axis A41 and the guide axis A42 may be 120 degrees. The guide axis A41 intersects with the guide axis A42. The guide axis A41 and the guide axis A42 have an intersection P. The intersection P coincides with a center C32 of the nozzle ring 32. The center C32 of the nozzle ring 32 may be read as the rotation axis AX.

The guide portion 41 has a guide hole 41G (e.g., a first guide) and a regulation pin 41P (e.g., a first pin). The guide hole 41G is provided in a ring main surface 32S of the nozzle ring main body 32a. The guide hole 41G is an elongated hole. The guide hole 41G extends in the direction of the guide axis A41. The shape of the regulation pin 41P is a column. The regulation pin 41P extends in a direction of the rotating shaft 2. A base end of the regulation pin 41P is fixed to the bearing housing 3. A tip end of the regulation pin 41P is disposed in the guide hole 41G. The nozzle ring 32 includes the guide hole 41G. The bearing housing 3 includes the regulation pin 41P. The guide hole 41G is formed on the guide axis A41 and is shaped to allow movement of the pin 41P in the direction of the guide axis A41. In some example, the housing 3 may include the guide hole 41G and the nozzle ring 32 may include the regulation pin 41P inserted in the guide hole 41G.

The guide portion 42 has a guide hole 42G (e.g., a second guide) and a regulation pin 42P (e.g., a second pin). In some examples, the guide hole 42G and the guide hole 41G may include substantially the same shape, but be placed in different locations. Similarly, the regulation pin 42P and the regulation pin 41P may be configured substantially the same as each other. In some examples, the housing 3 may include the guide hole 42G and the nozzle ring 32 may include the regulation pin 42P inserted in the guide hole 42G.

Example Operation

In the turbocharger 1, even in a case where the thermal deformation occurs, the relative positional relationship of the variable capacity mechanism 30 with respect to the bearing housing 3 is maintained due to the regulation of the regulation pin 41P and the guide hole 41G and the regulation of the regulation pin 42P and the guide hole 42G.

An example operation of the turbocharger 1 will be described in more detail. The nozzle ring 32 expands as a whole due to the thermal deformation. In some examples, the thermal deformation is isotropic in the circumferential direction and does not vary according to the direction. Then, a deformation of the guide portion 41 and the guide portion 42 is substantially limited to occurring in the radial direction. Due to the thermal deformation, a gap occurs between the inner peripheral surface of the shaft hole 32h of the nozzle ring 32 and the outer peripheral surface of the bearing housing 3. The position of the nozzle ring 32 with respect to the bearing housing 3 tends to change relatively due to this gap. However, translation of the variable capacity mechanism 30 is regulated by the guide portion 41 and the guide portion 42. The direction of the movement allowed by the guide portion 41 is different from the direction of the movement allowed by the guide portion 42. Therefore, the nozzle ring 32 is substantially regulated from translating in all directions. For example, an isotropic expansion or contraction of the nozzle ring 32 may be substantially limited to moving with respect to the center of the nozzle ring 32 as a starting point. As a result, even in a case where the thermal deformation occurs, the relative positional relationship of the variable capacity mechanism 30 with respect to the bearing housing 3 is maintained. Therefore, the relative movement associated with the first state, the second state, and the third state described above do not occur.

It is to be understood that not all aspects, advantages and features described herein may necessarily be achieved by, or included in, any one particular example. Indeed, having described and illustrated various examples herein, it should be apparent that other examples may be modified in arrangement and detail. For example, a configuration in which the relative positional relationship of the variable capacity mechanism 30 with respect to the bearing housing 3 can be maintained during operation may be adopted. Further, the relative positional relationship of the variable capacity mechanism 30 with respect to the bearing housing 3 does not have to be strictly unchanged between the stopped state and the operating state. That is, an allowable relative positional relationship of the variable capacity mechanism 30 with respect to the bearing housing 3 may be determined on the basis of an allowable range of performance fluctuation. Additional examples are discussed below with references to Modification Examples 1-6.

Modification Example 1

Figure 4:
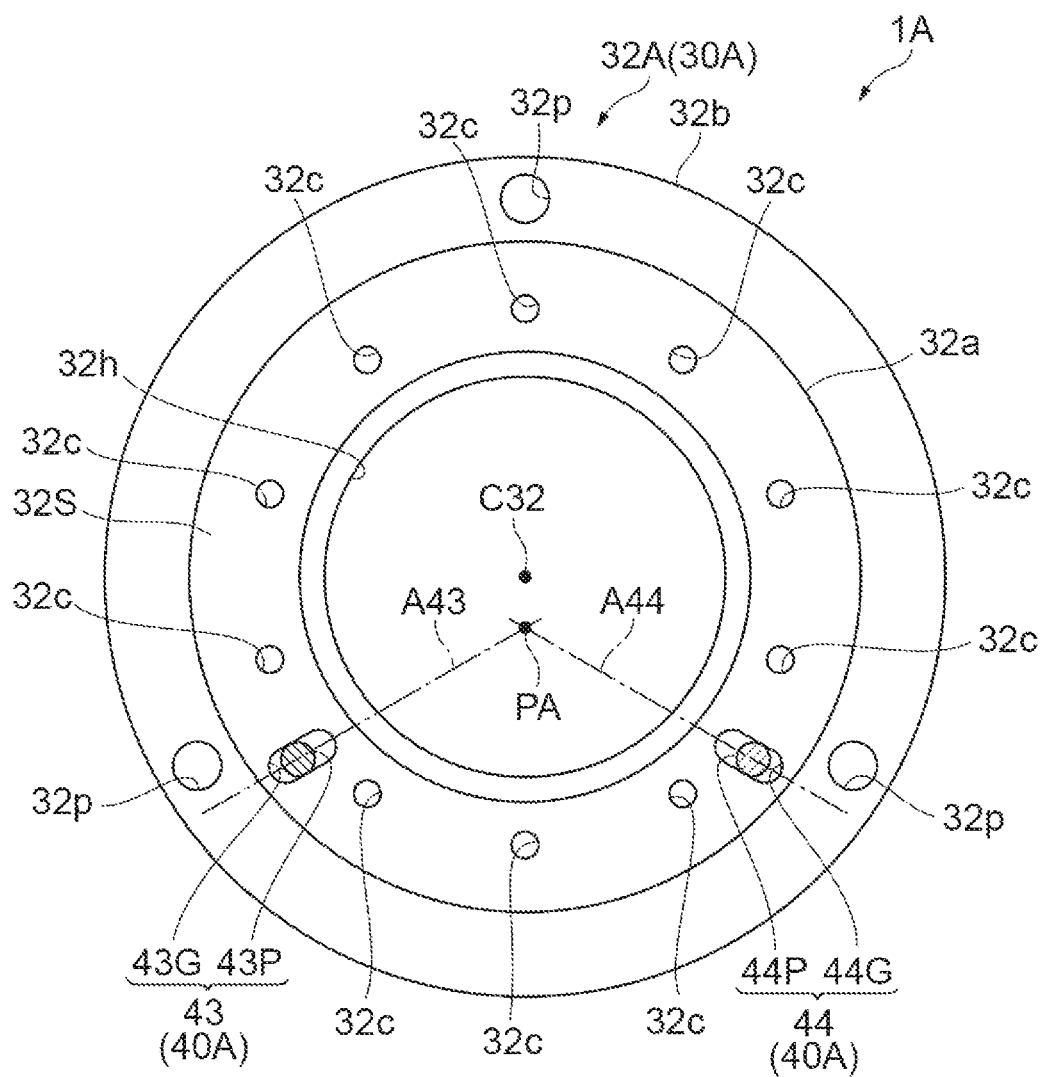
FIG. 4 is a plan view illustrating an example guide hole provided in a nozzle ring referred to as Modification Example 1.

FIG. 4 illustrates an example nozzle ring 32A included in a variable capacity mechanism 30A of a turbocharger 1A of Modification Example 1. A position deviation regulating mechanism 40A has guide portions 43 and 44. The guide portion 43 has a regulation pin 43P and a guide hole 43G. The guide portion 43 regulates, restricts or limits a direction in which plane movement of the nozzle ring 32A may occur into a direction of a guide axis A43 by the regulation pin 43P and the guide hole 43G. For example, the plane movement may be understood as providing movement in two dimensions including both translation (parallel movement) and rotational movement. The guide portion 44 has a regulation pin 44P and a guide hole 44G. The guide portion 44 regulates, restricts or limits a direction in which plane movement of the nozzle ring 32A may occur into a direction of a guide axis A44 by the regulation pin 44P and the guide hole 44G. The guide axis A43 of the guide portion 43 and the guide axis A44 of the guide portion 44 form an intersection PA. The center C32 of the nozzle ring 32A does not coincide with the intersection PA. A position of the intersection PA between the guide axis A43 and the guide axis A44 is different from a position of the center C32 of the nozzle ring 32A. The nozzle ring 32A of Modification Example 1 is different from the nozzle ring 32 described with reference to FIGS. 1 and 2, in that the intersection PA does not coincide with the center C32. Even if the intersection PA does not coincide with the center C32, the occurrence of relative position deviation of the variable capacity mechanism 30A with respect to the bearing housing 3 may be suppressed during operation. The positions of the guide portions 43 and 44 can be changed while maintaining the relative positional relationship of the other guide portion 44 with respect to one guide portion 43. For example, the guide portions 43 and 44 can be provided at positions that do not interfere with the vane shaft hole 32c. That is, the degree of freedom in designing the guide portions 43 and 44 can be increased. In some examples, the housing 3 may include the guide hole 41G and the guide hole 43G. The nozzle ring 32 may include the regulation pin 43P and the regulation pin 44P.

Modification Example 2

Figure 5:
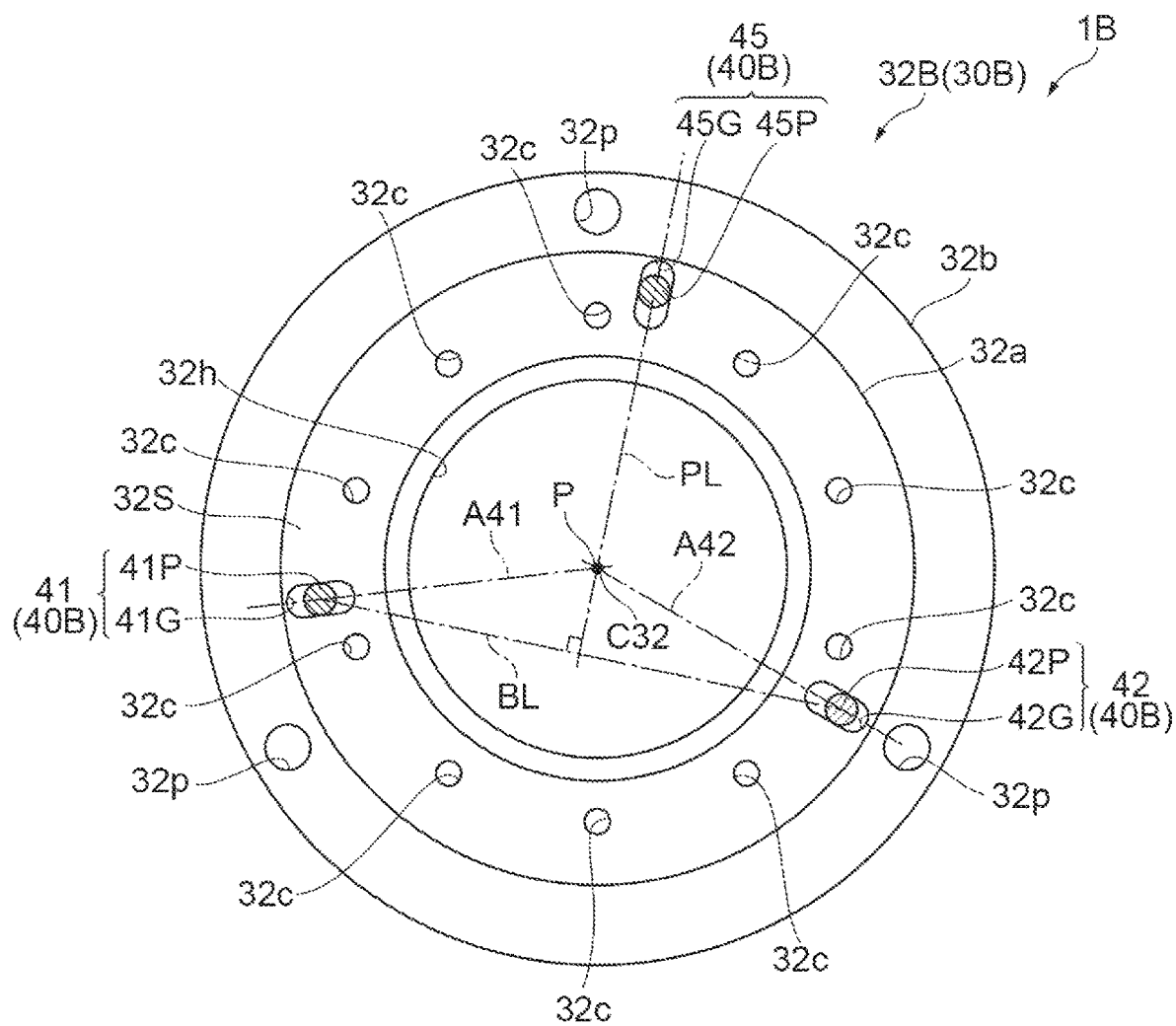
FIG. 5 is a plan view illustrating an example guide hole provided in a nozzle ring referred to as Modification Example 2.

FIG. 5 illustrates an example nozzle ring 32B included in a variable capacity mechanism 30B of a turbocharger 1B of Modification Example 2. A position deviation regulating mechanism 40B further has a guide portion 45 in addition to the guide portions 41 and 42. The turbocharger 1B of Modification Example 2 has three sets of guide portions 41, 42, and 45. The guide portion 45 has a regulation pin 45P (e.g., a third pin) and a guide hole 45G (e.g., a third guide). The guide portion 45 regulates, restricts or limits a direction in which plane movement of the nozzle ring 32B may occur into a direction of a guide axis PL (e.g., a third guide axis) by the regulation pin 45P and the guide hole 45G. According to the guide portions 41 and 42, a direction in which the nozzle ring 32B is allowed to be deformed is the direction of the guide axis PL. A reference line BL connecting a center axis of the regulation pin 41P and a center axis of the regulation pin 42P is set. The guide axis PL is a perpendicular bisector of the reference line BL. According to the guide portion 45, the thermal expansion is not hindered. That is, in a case where the thermal deformation is performed in a state where the position is determined by the guide portions 41 and 42, a direction of the thermal deformation coincides with the direction of the guide axis PL. According to this configuration, the thermal deformation can be allowed while increasing a contact area in order to reduce the influence of wear and the like. In some examples, the housing 3 may include the guide hole 41G, the guide hole 42G, and the guide hole 45G. The nozzle ring 32 may include the regulation pin 41P, the regulation pin 42P and the regulation pin 45P.

Modification Example 3

Figure 6:
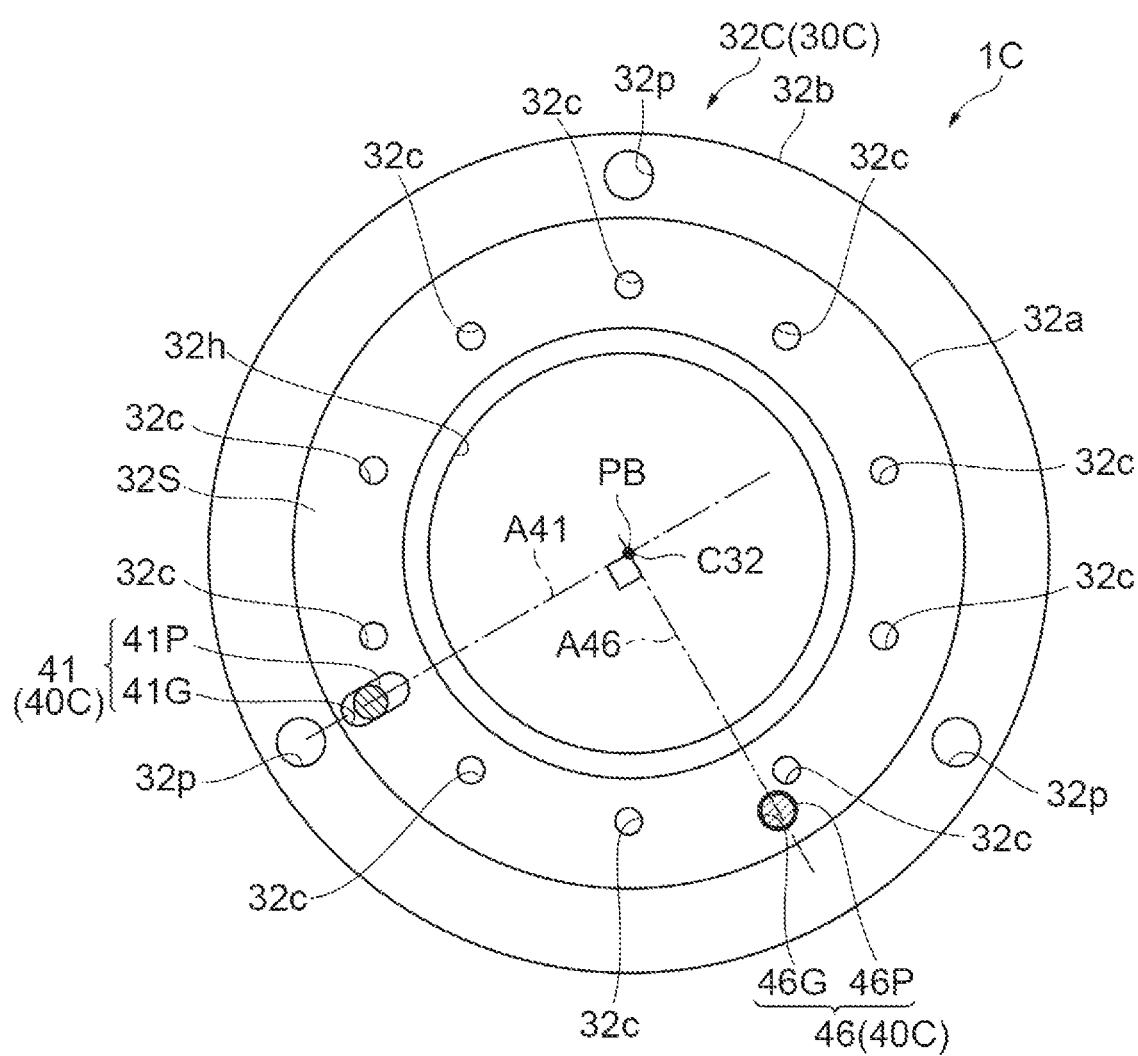
FIG. 6 is a plan view illustrating an example guide hole provided in a nozzle ring referred to as Modification Example 3.

FIG. 6 illustrates an example nozzle ring 32C included in a variable capacity mechanism 30C of a turbocharger 1C of Modification Example 3. A position deviation regulating mechanism 40C has a guide portion 41 and a guide portion 46. The guide portion 46 has a regulation pin 46P and a guide hole 46G. The guide portion 46 regulates, restricts or limits a direction in which plane movement of the nozzle ring 32C may occur around an axis of the guide hole 46G by the regulation pin 46P and the guide hole 46G. The guide hole 46G is provided on a perpendicular line A46 to the guide axis line A41. An intersection PB between the guide axis A41 and the perpendicular line A46 overlaps the center C32 of the nozzle ring 32C. The regulation pin 46P is a columnar component similar to the regulation pin 42P illustrated in FIG. 3. On the other hand, the guide hole 46G is a round hole. That is, the guide hole 46G is not an elongated hole unlike the guide hole 41G illustrated in FIG. 3. The turbocharger 1C of Modification Example 3 is different from the turbocharger 1 illustrated in FIG. 1 in that the guide hole 46G is a round hole. Therefore, the guide portion 46 substantially limits rotational movement of the nozzle ring 32C to occurring around the axis of the guide hole 46G. That is, the guide portion 46 regulates translation of the nozzle ring 32C. Also with this configuration, an occurrence of the relative position deviation of the variable capacity mechanism 30C with respect to the bearing housing 3 may be suppressed during operation. In Modification Example 3, the intersection PB between the guide axis A41 and the perpendicular line A46 overlaps the center C32 of the nozzle ring 32C. However, the intersection PB may not overlap the center C32. That is, the intersection PB may be deviated from the center C32 as in Modification Example 1. In some examples, the housing 3 may include the guide hole 41G and the guide hole 46G. The nozzle ring 32 may include the regulation pin 41P and the regulation pin 46P.

Modification Example 4

Figure 7:
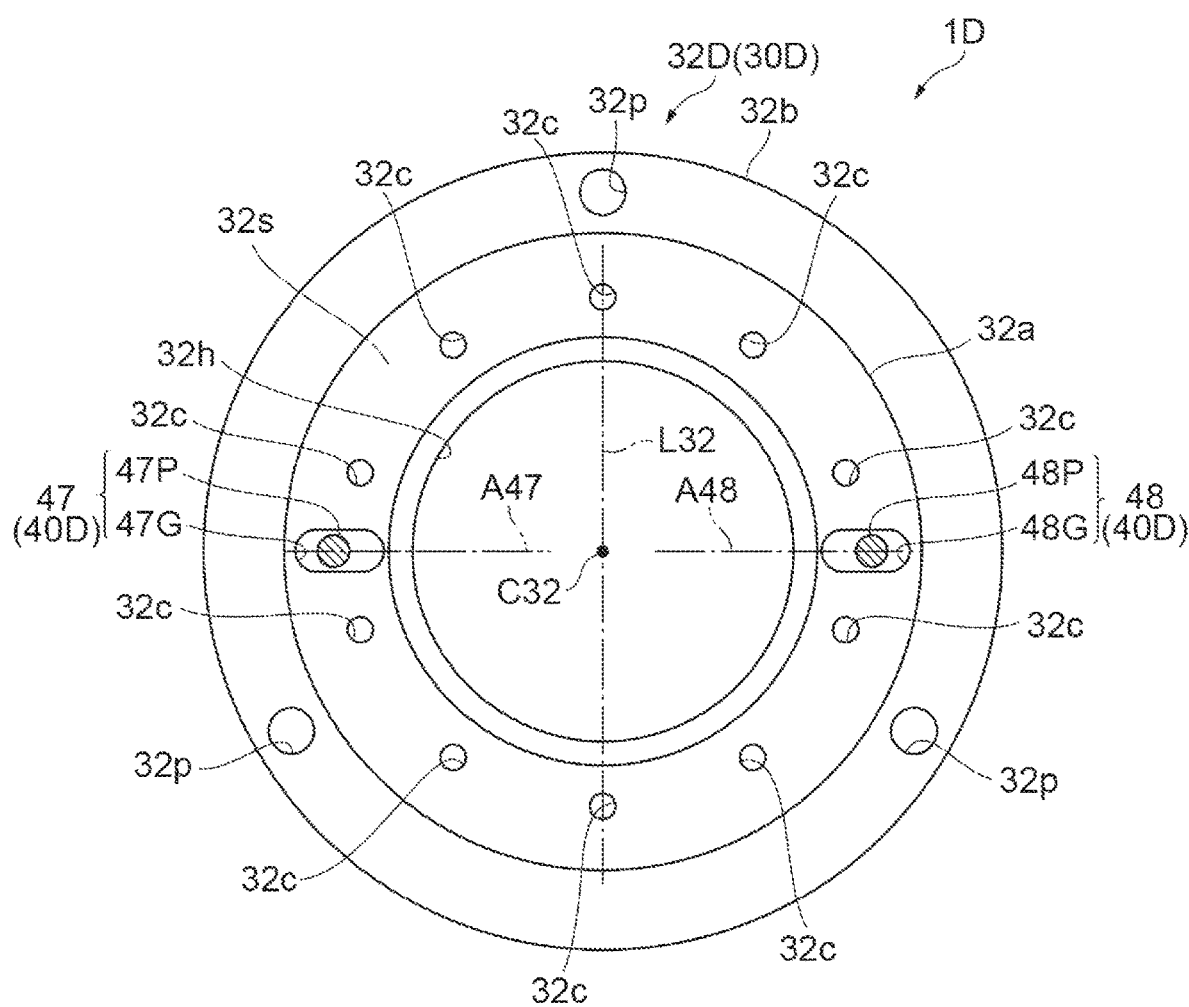
FIG. 7 is a plan view illustrating an example guide hole provided in a nozzle ring referred to as Modification Example 4.

FIG. 7 illustrates an example nozzle ring 32D included in a variable capacity mechanism 30D of a turbocharger 1D of Modification Example 4. A position deviation regulating mechanism 40D has guide portions 47 and 48. The guide portion 47 has a regulation pin 47P and a guide hole 47G. The guide portion 47 regulates, restricts or limits a direction in which plane movement of the nozzle ring 32D may occur into a direction of a guide axis A47 by the regulation pin 47P and the guide hole 47G. The guide portion 48 has a regulation pin 48P and a guide hole 48G. The guide portion 48 regulates, restricts or limits a direction in which plane movement of the nozzle ring 32D may occur into a direction of a guide axis A48 by the regulation pin 48P and the guide hole 48G. The relative positions of the guide portions 47 and 48 of Modification Example 4 are different from the relative positions of the guide portions 41 and 42 illustrated in FIG. 3. For example, the guide axis A41 intersects with the guide axis A42. The direction of the guide axis A41 is different from the direction of the guide axis A42. In Modification Example 4, the direction of the guide axis A47 is the same as the direction of the guide axis A48. The guide axis A47 of the guide portion 47 does not intersect with the guide axis A48 of the guide portion 48. The guide axis A47 does not have an intersection with the guide axis A48. In Modification Example 4, the guide axis A47 overlaps the guide axis A48. In some examples, the guide axis A47 and the guide axis A48 are the same guide axis. According to the relationship between the guide axis A47 and the guide axis A48, it can also be said that the guide portions 47 and 48 are disposed point-symmetrically with the center C32 of the nozzle ring 32 interposed therebetween. Further, it can also be said that the guide portions 47 and 48 are disposed line-symmetrically with respect to an axis L32 passing through the center C32 of the nozzle ring 32. Also with this configuration, an occurrence of the relative position deviation of the variable capacity mechanism 30D with respect to the bearing housing 3 may be suppressed during operation. In some examples, the housing 3 may include the guide hole 47G and the guide hole 48G. The nozzle ring 32 may include the regulation pin 47P and the regulation pin 48P.

Modification Example 5

Figure 8:
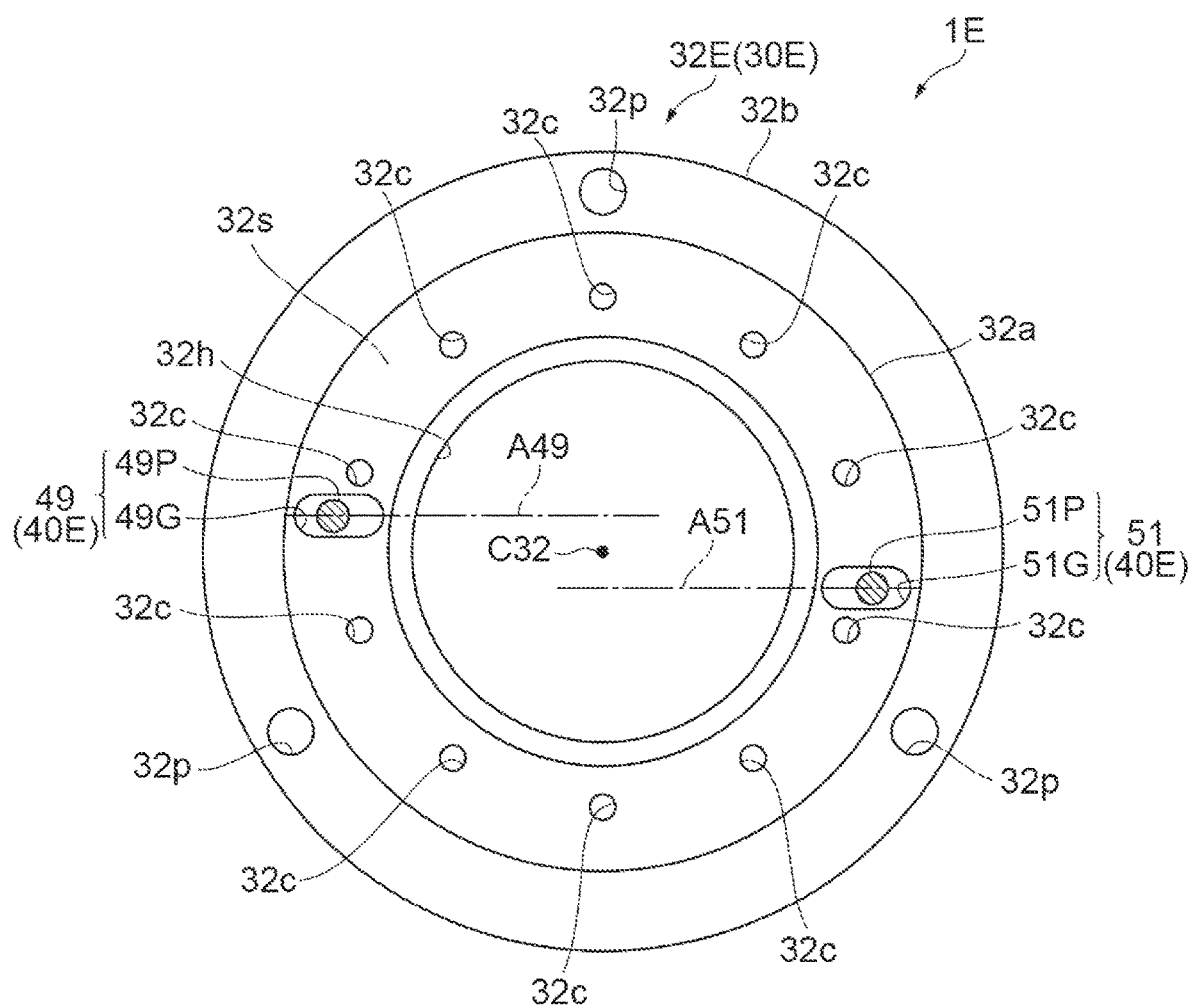
FIG. 8 is a plan view illustrating an example guide hole provided in a nozzle ring referred to as Modification Example 5.

FIG. 8 illustrates an example nozzle ring 32E included in a variable capacity mechanism 30E of a turbocharger 1E of Modification Example 5. In Modification Example 5, a position deviation regulating mechanism 40E has guide portions 49 and 51. The guide portion 49 has a regulation pin 49P and a guide hole 49G. The guide portion 49 regulates, restricts or limits a direction in which plane movement of the nozzle ring 32E may occur into a direction of a guide axis A49 by the regulation pin 49P and the guide hole 49G. The guide portion 51 has a regulation pin 51P and a guide hole 51G. The guide portion 51 regulates, restricts or limits a direction in which plane movement of the nozzle ring 32E may occur into a direction of a guide axis A51 by the regulation pin 51P and the guide hole 51G. In the guide portions 49 and 51, the direction of the guide axis A49 is the same as the direction of the guide axis A51 as in Modification Example 4. The guide axis A49 does not overlap the guide axis A51. The guide axis A49 and the guide axis A51 are separated from each other so as to be parallel to each other. The guide axis A49 is separated from the guide axis A51 in a direction orthogonal to the guide axis A49. According to the relationship between the guide axes, it can also be said that the guide portions 49 and 51 are disposed point-symmetrically with the center C32 of the nozzle ring 32E interposed therebetween. The guide portions 49 and 51 are not disposed line-symmetrically with respect to an axis passing through the center C32 of the nozzle ring 32E. Also with this configuration, an occurrence of the relative position deviation between the variable capacity mechanism 30E and the bearing housing 3 may be suppressed during operation. In some examples, the housing 3 may include the guide hole 49G and the guide hole 51G. The nozzle ring 32 may include the regulation pin 49P and the regulation pin 51P.

Modification Example 6

Figure 9:
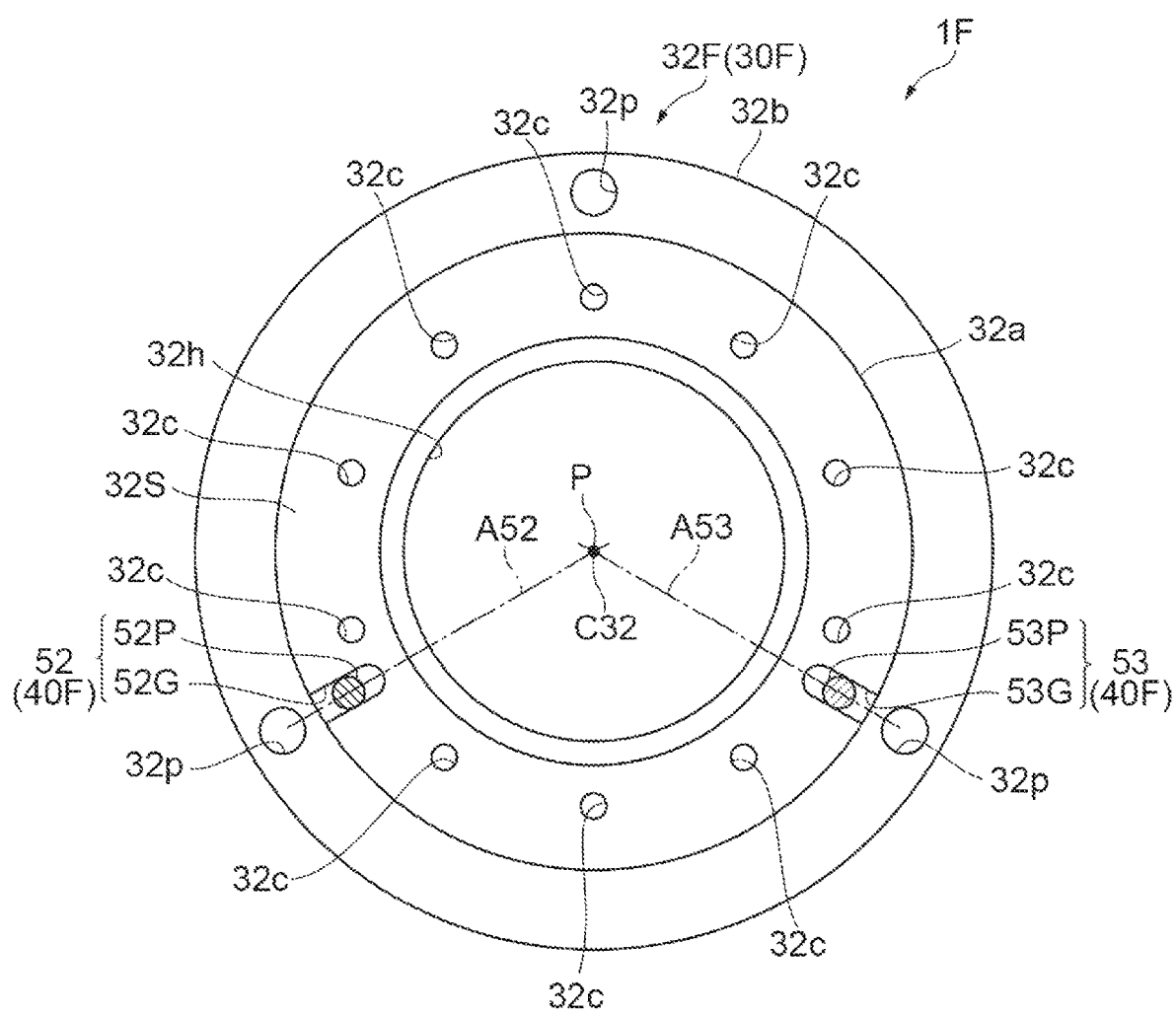
FIG. 9 is a plan view illustrating an example guide hole provided in a nozzle ring referred to as Modification Example 6.

FIG. 9 illustrates an example nozzle ring 32F included in a variable capacity mechanism 30F of a turbocharger 1F of Modification Example 6. In Modification Example 6, a position deviation regulating mechanism 40F has guide portions 52 and 53. The positions where the guide portions 52 and 53 are provided are the same as those of the guide portions 41 and 42 illustrated in FIG. 3. The guide portion 52 has a regulation pin 52P and a guide groove 52G. The guide portion 52 regulates, restricts or limits a direction in which plane movement of the nozzle ring 32F may occur into a direction of a guide axis A52 by the regulation pin 52P and the guide groove 52G. The guide portion 53 has a regulation pin 53P and a guide groove 53G. The guide portion 53 regulates, restricts or limits a direction in which plane movement of the nozzle ring 32F may occur into a direction of a guide axis A53 by the regulation pin 53P and the guide groove 53G. The turbocharger 1F of Modification Example 6 is different from the turbocharger 1 illustrated in FIG. 1 in that the turbocharger 1F has the guide groove 52G instead of the guide hole 41G. The turbocharger 1F of Modification Example 6 is also different from the turbocharger 1 in that the turbocharger 1F has the guide groove 53G instead of the guide hole 42G. A portion that guides the regulation pin is not limited to the elongated hole with both ends closed. The portion may be a groove in which one end portion is open such as the guide grooves 52G and 53G. The guide grooves 52G and 53G have an opening on the outer peripheral surface of the nozzle ring main body 32a at the end portion on an outer peripheral side thereof. In some examples, the housing 3 may include the guide groove 52G and the guide hole 53G. The nozzle ring 32 may include the regulation pin 52P and the regulation pin 53P.

What is claimed is:

1. A turbocharger comprising:
a first housing configured to house a turbine impeller;
a second housing configured to rotatably support a rotating shaft to which the turbine impeller is fixed; and
a variable capacity mechanism configured to surround the turbine impeller and to guide a fluid to the turbine impeller,
wherein the variable capacity mechanism has a nozzle ring that faces the second housing,
wherein a first pin and a second pin extend between the second housing and the nozzle ring,
wherein the first pin is disposed in a first guide shaped as an elongated hole or groove,
wherein the second pin is disposed in a second guide, and
wherein a first guide axis extends along the elongated hole or groove and intersects with a rotation axis of the turbine impeller.

2. The turbocharger according to claim 1, wherein the rotation axis of the turbine impeller is colinear with a rotation axis of the rotating shaft.

3. The turbocharger according to claim 1, wherein the first guide and the second guide are provided in the nozzle ring.

4. The turbocharger according to claim 3,
wherein the second guide is a round hole,
wherein the second guide is provided on a perpendicular line to the first guide axis, and
wherein an intersection between the first guide axis and the perpendicular line overlaps a center of the nozzle ring.

5. The turbocharger according to claim 1,
wherein the nozzle ring is provided with a through hole, and
wherein the second housing is provided with a fitting portion configured to fit into the through hole.

6. A turbocharger comprising:
a first housing configured to house a turbine impeller;
a second housing disposed adjacent to the first housing;
a nozzle ring disposed between the first housing and the second housing; and
a nozzle vane disposed between the nozzle ring and the first housing and rotatably supported by the nozzle ring,
wherein a first pin and a second pin extending in a direction of a rotating shaft of the turbine impeller are attached to the second housing,
wherein a first guide into which the first pin is inserted is provided in the nozzle ring,
wherein a second guide into which the second pin is inserted is provided in the nozzle ring,
wherein the first guide is provided on a first guide axis and is shaped to allow movement of the first pin in a direction of the first guide axis, and
wherein the first guide is a partially open groove.

7. The turbocharger according to claim 6, wherein the first guide axis intersects the rotating shaft, and the second guide is a round hole.

8. The turbocharger according to claim 6, wherein the first guide radially extends from a rotation axis of the rotating shaft.

9. A turbocharger comprising:
a first housing configured to house a turbine impeller and having a scroll flow path;
a second housing configured to rotatably support a rotating shaft of the turbine impeller; and
a nozzle ring facing the second housing and forming a connecting flow path communicating with the scroll flow path,
wherein the nozzle ring comprises a first guide which is an elongated hole or groove provided on a first guide axis that is perpendicular to a rotation axis of the rotating shaft, and a second guide which is an elongated hole or groove provided on a second guide axis that is perpendicular to the rotation axis, and
wherein the second housing comprising a first pin inserted in the first guide and a second pin inserted in the second guide.

10. The turbocharger according to claim 9, wherein the first guide axis intersects with the second guide axis on the rotation axis.

11. The turbocharger according to claim 9, wherein the first guide axis forms an intersection with the second guide axis which is spaced away from the rotation axis.

12. The turbocharger according to claim 9, wherein the rotation axis is located between the first guide axis and the second guide axis.

13. A turbocharger comprising:
a first housing configured to house a turbine impeller;
a second housing configured to rotatably support a rotating shaft to which the turbine impeller is fixed; and
a variable capacity mechanism configured to surround the turbine impeller and to guide a fluid to the turbine impeller,
wherein the variable capacity mechanism has a nozzle ring that faces the second housing,
wherein a first pin and a second pin extend between the second housing and the nozzle ring,
wherein the first pin is inserted in a first guide which is an elongated hole or groove provided on a first guide axis,
wherein the second pin is inserted in a second guide, and
wherein the first guide axis is perpendicular to a rotation axis of the rotating shaft.

14. The turbocharger according to claim 13, wherein the first guide axis intersects with the rotation axis.

15. The turbocharger according to claim 13,
wherein the second guide is a round hole,
wherein the second guide is provided on a perpendicular line to the first guide axis, and
wherein an intersection between the first guide axis and the perpendicular line does not overlap a center of the nozzle ring.

16. The turbocharger according to claim 13, further comprising a third pin extending between the second housing and the nozzle ring,
wherein an end portion of the third pin is disposed in a third guide which is provided in the nozzle ring.

17. The turbocharger according to claim 16,
wherein the third guide is an elongated hole or groove extending in a direction of a third guide axis that intersects with a rotation axis of the turbine impeller, and
wherein the third pin is disposed on a perpendicular bisector of a line connecting a center of the first pin and a center of the second pin.

18. The turbocharger according to claim 13,
wherein the second guide is an elongated hole or groove extending in a direction of a second guide axis that is not parallel with the first guide axis,
wherein the first guide axis intersects with the second guide axis, and
wherein a point where the first guide axis and the second guide axis intersect with each other does not overlap a center of the nozzle ring.

19. The turbocharger according to claim 13, wherein the second guide is an elongated hole or groove extending in a direction of a second guide axis that is parallel to the first guide axis.

20. The turbocharger according to claim 13, wherein the first guide and the second guide are provided on the same guide axis.

* * * * *